United States Patent [19]
Kyriacou

[11] Patent Number: 5,316,326
[45] Date of Patent: May 31, 1994

[54] MULTI-PURPOSE SUSPENSION SYSTEM

[76] Inventor: Nestor E. Kyriacou, Dodecanisou St., Limassol, Cyprus

[21] Appl. No.: 993,317

[22] Filed: Dec. 18, 1992

Related U.S. Application Data

[63] Continuation-in-part of Ser. No. 712,112, Jun. 7, 1991, abandoned.

[51] Int. Cl.$^5$ .............................................. B62D 21/00
[52] U.S. Cl. .................................... 280/104; 280/781; 280/788; 280/715; 280/DIG. 1
[58] Field of Search ............... 280/104, 781, 788, 790, 280/697, 688, 128, 131, 134, 135, 140, 141, 840, DIG. 1, 715

[56] References Cited

U.S. PATENT DOCUMENTS

| | | | |
|---|---|---|---|
| 1,589,859 | 6/1926 | Nelson | 280/104 |
| 2,819,093 | 1/1958 | Geiser | 280/112.2 |
| 3,448,993 | 6/1969 | Gorge | 280/788 |
| 3,869,140 | 3/1975 | Allison | 280/715 |
| 4,161,322 | 7/1979 | Ekeborg | 280/6.1 |

FOREIGN PATENT DOCUMENTS

| | | | |
|---|---|---|---|
| 2747394 | 4/1978 | Fed. Rep. of Germany | 280/104 |
| 1033673 | 7/1953 | France . | |
| 132685 | 10/1919 | United Kingdom . | |

OTHER PUBLICATIONS

International Search Report for PCT/GB91/00455.

*Primary Examiner*—Margaret A. Focarino
*Assistant Examiner*—Peter C. English
*Attorney, Agent, or Firm*—Weingarten, Schurgin, Gagnebin & Hayes

[57] ABSTRACT

A multi-purpose suspension system for resiliently mounting a rigid body on a rigid base assembly includes an intermediate frame supported from the base assembly by a spring for providing limited relative angular movement about an axis vertically aligned with the central longitudinal axis of the base assembly and for pivotally supporting the body for limited horizontal and vertical movement relative thereto, and an arm pivotally mounted on at least one end of the base assembly for providing limited angular movement relative thereto about an axis parallel with the axis of rotation of the intermediate frame, the arm being connected by links to opposite sides of the body.

20 Claims, 10 Drawing Sheets

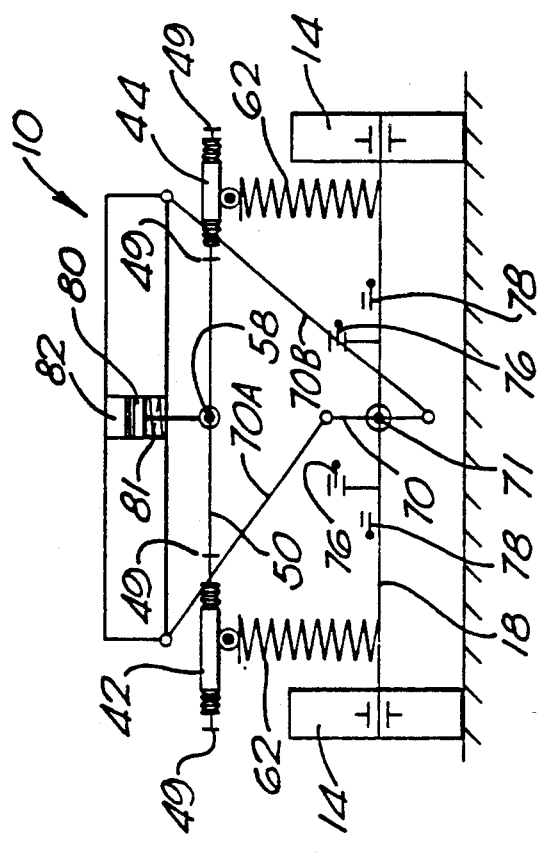

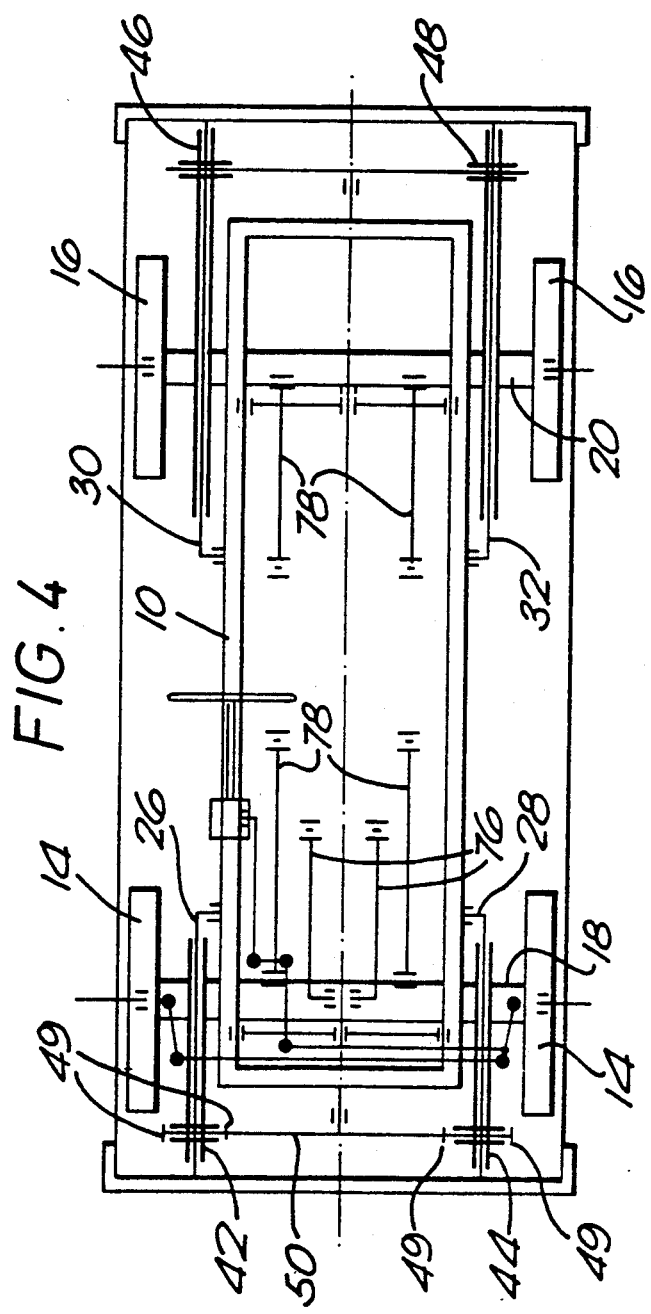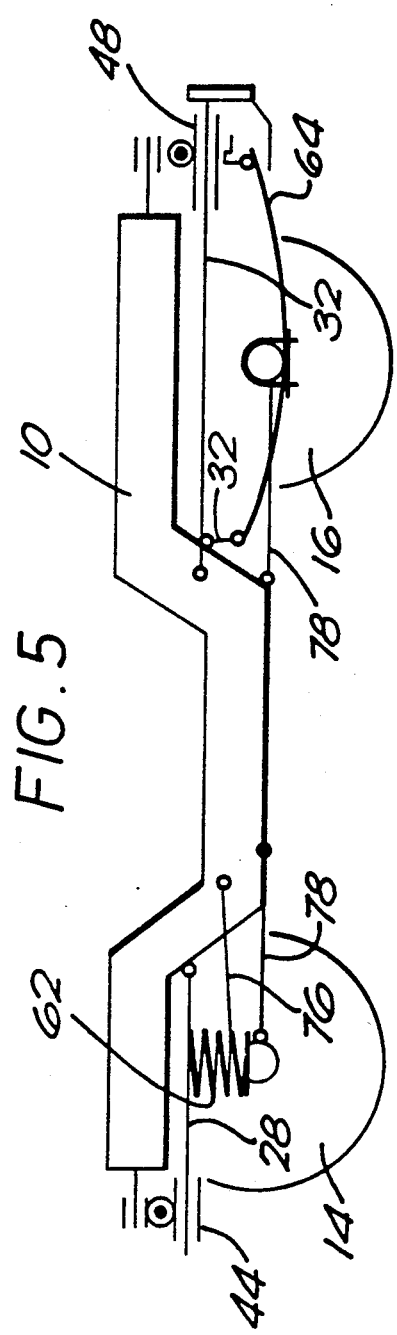

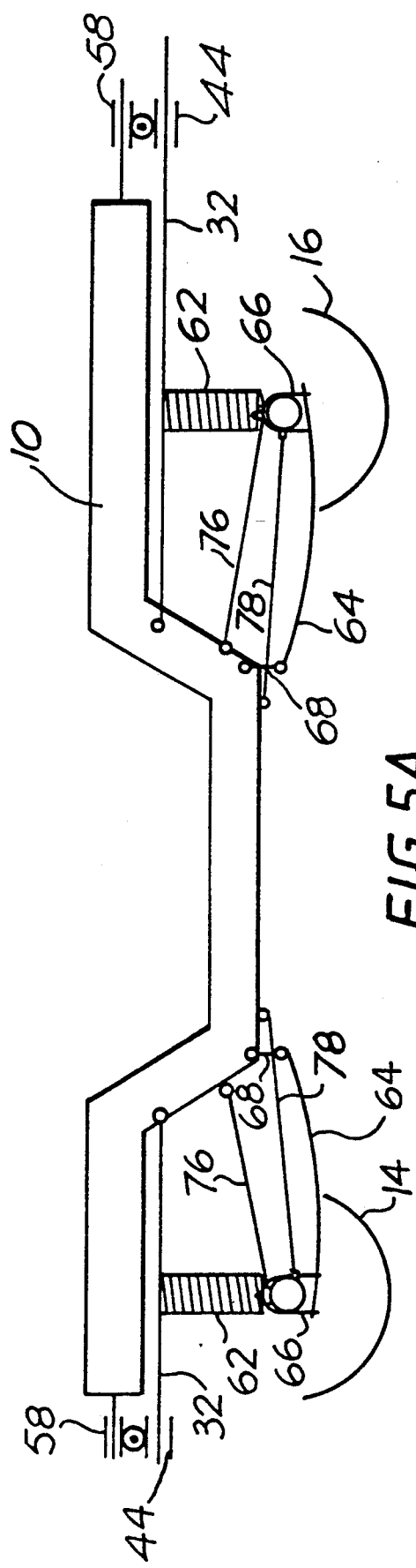
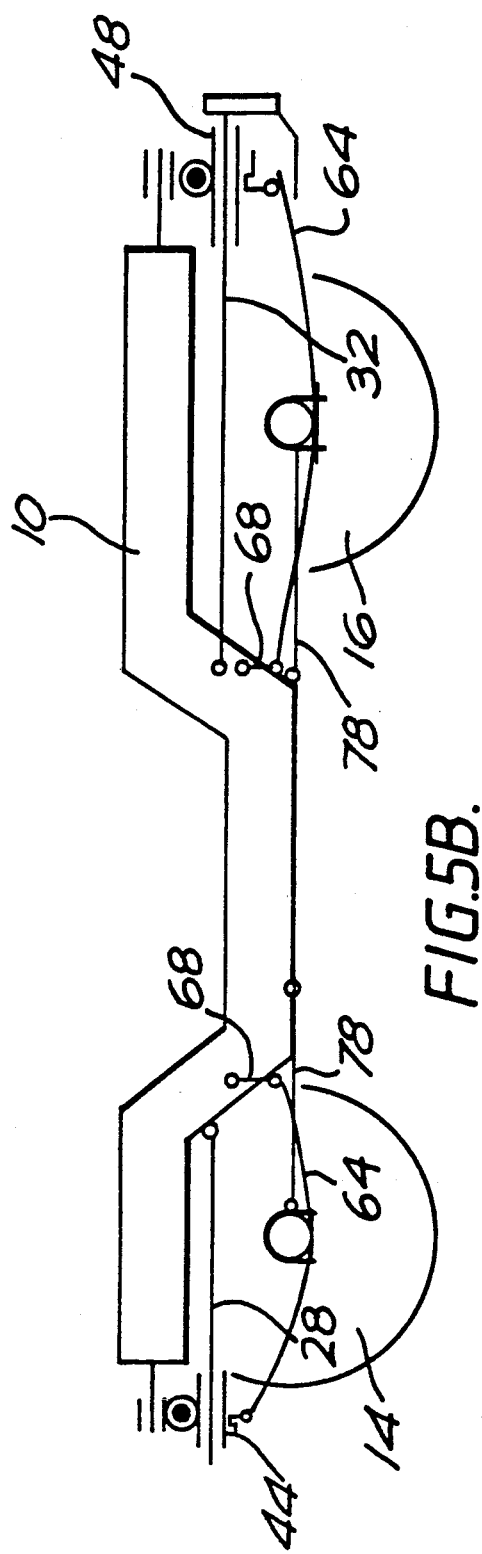

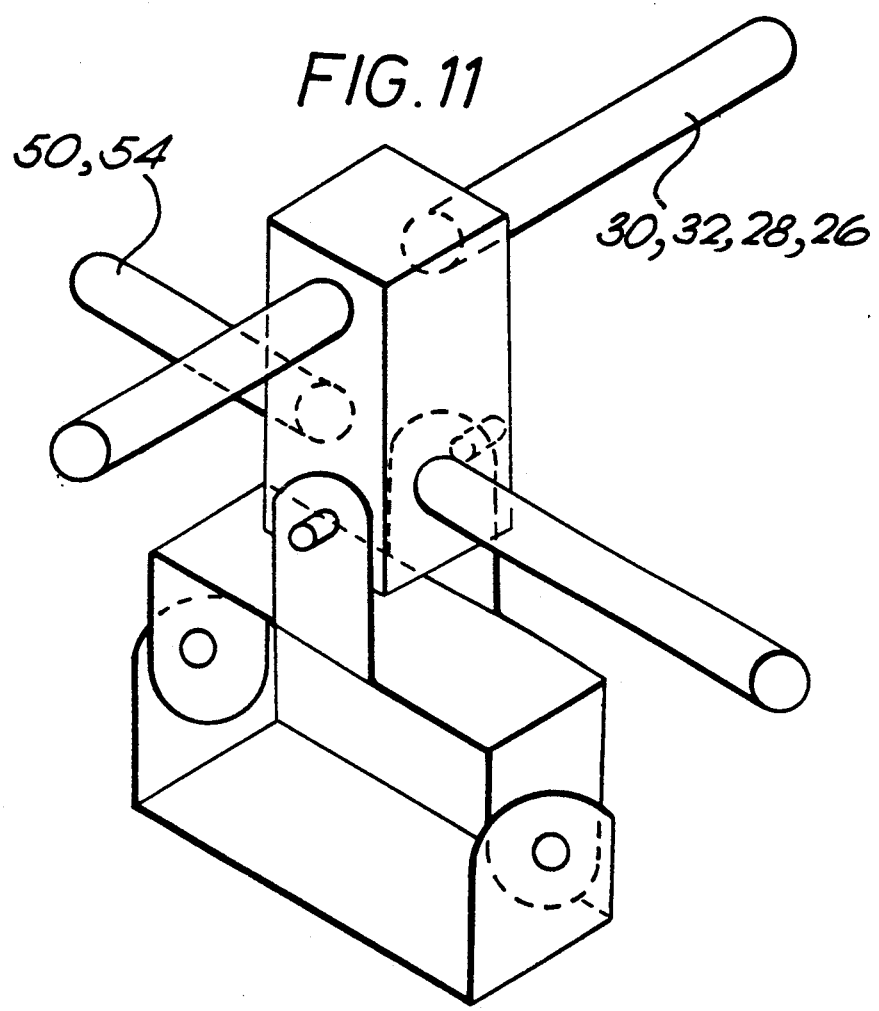

MULTI-PURPOSE SUSPENSION SYSTEM

This application is a continuation-in-part of commonly owned application Ser. No. 07/712,112 filed on Jun. 7, 1991 now abandoned.

This invention relates to a suspension system for improving the static or dynamic stability of bodies which rest on or move over land or water or which move through the air and is particularly, though not exclusively, applicable to the passenger, freight or luggage compartment of land, air and water vehicles and to those parts of building structures which extend above the ground, all of which will be hereinafter referred to as bodies.

Rigid bodies of the kind referred to may, dependent upon their location and purpose, be subjected to a variety of shocks caused, among other things, by waves, uneven ground, earth tremors, or air turbulence and it is a principal object of the invention to minimise the effect of these or other phenomena on a wide variety of bodies by breaking down the usual monolithic structure having a single centre of gravity into a complex arrangement of separate masses each having its own centre of gravity and being independently connected to at least one of the other masses to permit relative movement of one with respect to the others.

One known example of such an arrangement has already been applied to the suspension of a motor vehicle required to travel over particularly uneven terrain and involves the provision of an arm pivotally mounted on at least one end of the vehicle chassis for limited angular movement about an axis extending along the longitudinal centre line of the vehicle and connected to the wheel axle by links slidably mounted in the ends of the arm and incorporating springs exerting downward pressure on the axle.

According to the present invention, a suspension system for resiliently mounting a rigid body on a rigid base assembly comprises an intermediate frame, spring-supported from said base assembly for limited relative angular movement about an axis vertically aligned with the central longitudinal axis of the base assembly and supporting said body for limited horizontal and vertical movement relative thereto and arm means pivotally mounted on at least one end of said base assembly for limited angular movement relative thereto about an axis parallel with the axis of rotation of said intermediate frame, said arm means being connected to opposite sides of said body.

One embodiment of the invention will be described, by way of example, as applied to a motor vehicle for use over uneven and difficult terrain and in the accompanying diagrammatic drawings:

FIG. 2 is a front view of a suspension system in accordance with the first embodiment of the invention;

FIG. 3 is a side view of the suspension system of FIG. 2;

FIG. 4 is a plan view of a suspension system in accordance with a second embodiment of the invention employing semi-elliptical leaf springs or coil springs;

FIG. 5 is a side view of the suspension system of FIG. 4;

FIG. 5A is a side view of a third embodiment of the invention;

FIG. 5C is a side view of a suspension system having a quarter-elliptical leaf spring with a first end secured to an intermediate frame;

FIG. 11 is a perspective view, on an enlarged scale, of a cross-linkage to be employed with the split type or solid axles shown in the Figures.

Figure 1:
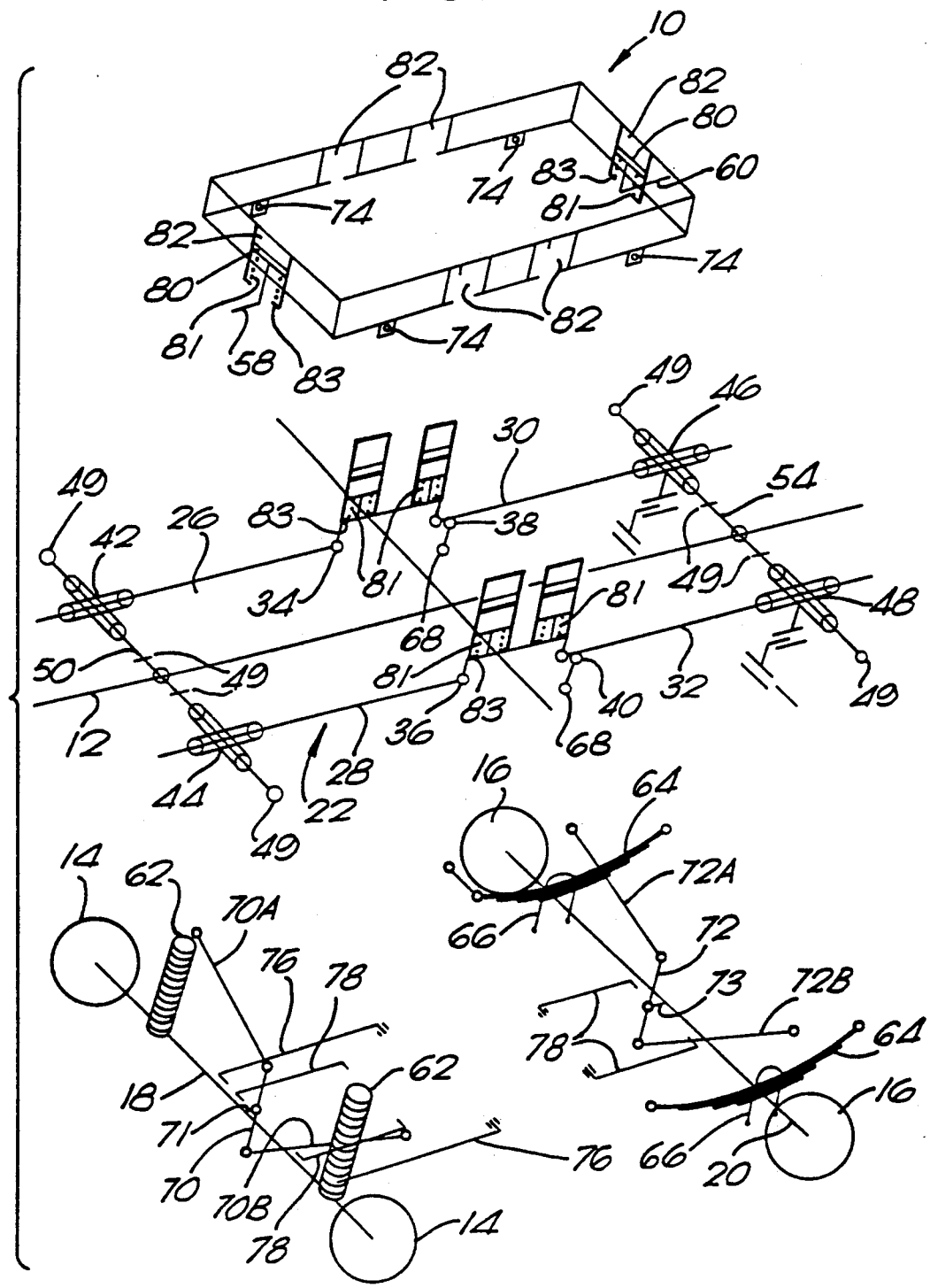
FIG. 1 is an exploded perspective view of a vehicle suspension system in accordance with a first embodiment of the invention, which may employ semi-elliptical leaf springs or coil springs.

Referring to FIGS. 1 to 3, there is shown a vehicle chassis/body structure 10, supporting means in the form of front 14 and rear 16 tired road wheels, mounted on respective axles 18, 20, and a suspension system interposed between the support means and the body structure 10. The suspension system comprises an intermediate frame 22 having opposed pairs of lateral arms 26, 28, 30, 32, each arm 26, 28, 30, 32 being pivotably mounted at one end on a respective pin 34, 36, 38, 40. The other end of each arm 26, 28, 30, 32 is slidably attached to respective cross linkages 42, 44, 46, 48 provided at each of the four corners of the frame 22. Further arms 50 and 54 are provided at the front and rear ends, respectively, of the frame 22 and are pivotably mounted on the ends of body structure 10 by means of pins 58, 60 which lie on the longitudinal centre line (12) of the body structure 10. The opposite ends of the front and rear arms 50, and 54, respectively, are slidably attached to respective cross slides or cross linkages 42, 44 and 46, 48. Stops 49 are provided on the arms 50 and 54, at both sides of cross-links 42, 44, 46, 48 to limit radial motion of the vehicle body structure 10.

Figure 5C:
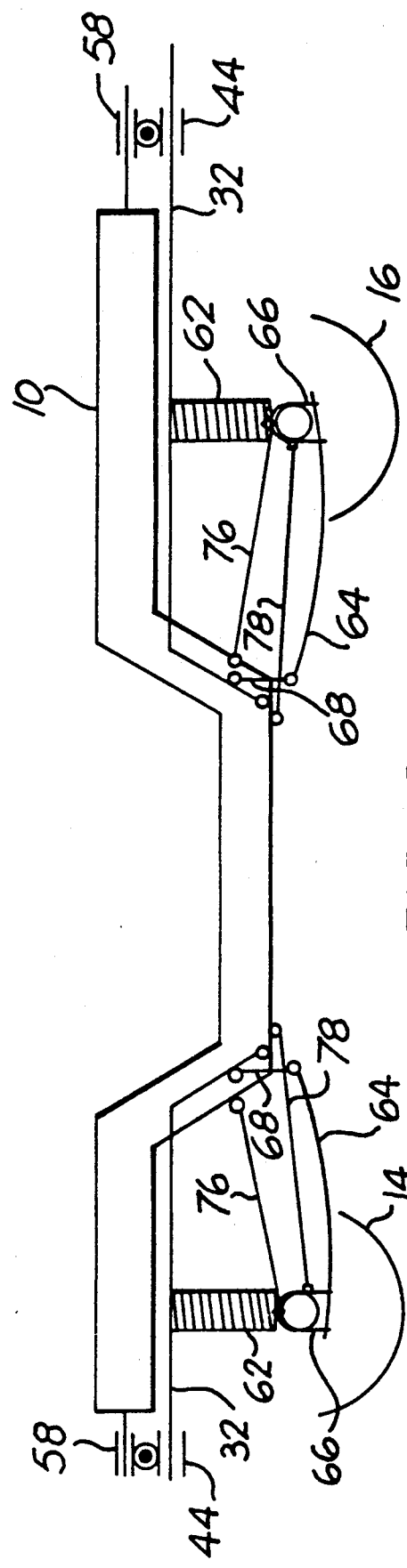
FIG. 5C is a side view of a suspension system having a semi-elliptical leaf spring with an inner end secured to a rigid body.
Figure 6:
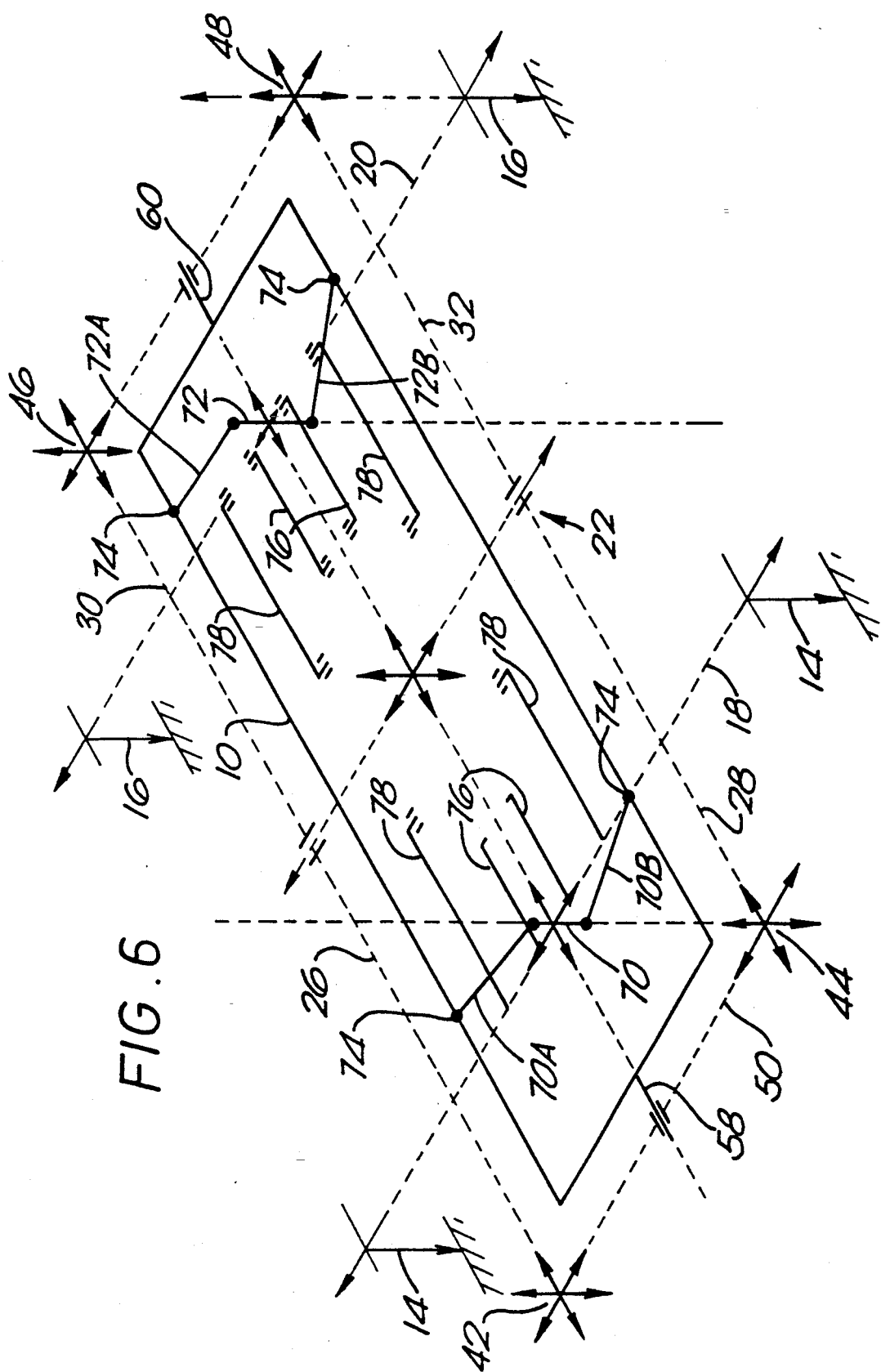
FIG. 6 illustrates the theoretical principal underlying the suspension system of the invention and the directions of movement of the various components of the suspension system.

Front road wheels 14 mounted on axle 18 are urged downward by coil springs 62 interposed between the axle 18 and the frame 22. The coil springs 62 are attached at their upper ends to the lateral arms 26, 28 of the frame 22 and at their lower ends to the axle 18. Rear road wheels 16 mounted on the axle 20 are urged downward by semi-elliptic leaf springs 64 interposed between the axle 20 and the frame 22. U bolts 66 fix the leaf springs 64 to the axle 20 and the leaf springs 64 are pivotably mounted at both ends on the frame 22 by means of shackles 68 which are pivotably mounted on the lateral arms 30, 32, of the frame 22 (see FIGS. 1 and 5). The provision of pivotably mounted shackles 68 permits greater movement of the leaf springs 64 relative to the body structure 10 and enables the arms 76, described hereinafter, to be omitted. The front coil springs 62 may be replaced by semi-elliptical leaf springs attached in the same manner as the rear springs 64. As shown in FIG. 5B, the semi-elliptical leaf springs at the front and/or rear may be pivotably secured at their inner ends to the body structure 10, for example by means of shackles, instead of to the frame 22. Also it will be apparent to the skilled man that, instead of the particular spring arrangement illustrated in FIGS. 1 to 5, a number of alternative arrangements are possible. For example, as shown in FIG. 5A a combination of a coil spring and a quarter elliptical leaf spring may be used in which the coil spring is interposed between axle 18 and/or 20 and frame 22 (including arms 26, 28, 30, 32), as previously described, and the quarter elliptical leaf spring is fixed by its outer end to the same axle 18 and-/or 20 and by its inner end either to the frame 22 or to the rigid body 10. In one alternative embodiment shown in FIG. 5B, the semi-elliptical leaf spring is provided having an inner end secured to the rigid body rather than the intermediate body. In another alternative embodiment shown in FIG. 5C, a quarter-elliptical leaf spring is provided having a first end secured to the intermediate frame. It will also be apparent to the skilled man that alternative spring means known in the art, such as piston means operated by pressurised fluid, air or hydraulic fluid and torsion bars, may be used instead or that any combination of known spring means may be used.

Arm means 70, 72 are mounted for rotation at the centre of the front 18 and rear 20 axles on pins 71 and 73 respectively, the axes of which coincide with the central vertical axis of the body structure assembly, at both the front and rear ends. The arm means 70, 72 each have respective right 70A, 72A and left 70B, 72B pivoted extensions extending to the body structure 10 and pivotably mounted on brackets 74 on said body structure. The arm means 70, 72 and their extensions limit or control body roll when the vehicle is driven around bends, during braking or when being driven over uneven surfaces.

A pair of arms 78 are pivotably mounted at one end on each of the axles 18, 20 and a pair of arms 76 are pivotably mounted at one end and at a different level to the arms 78 only on each axle to which coil springs 62 are attached. The arms 76, 78 are pivotably mounted at their other ends on the body 10 and contribute to the control of the radial motion of the body during cornering, and to the forward motion of the body during braking (see FIGS. 2 and 3).

Preferably, body structure 10 is formed with ports 82 to receive piston means 80, bedding on springs 81, held in position on the body structure by holder 83. Both piston means at the left and right side of the body structure are connected together at 80A for simultaneous movement. The piston means 80, when operating media is supplied to the spaces above the pistons, will raise the body structure 10 to a higher level relative to the ground and serve to absorb or regulate shocks which tend to disturb the wheels 14, 16 and the comfortable ride of the vehicle body structure 10. By raising the body structure 10 relative to the ground, the system provides the further advantages of higher axle displacement, improved shock absorbtion and further free motions within its system, namely vertical up and down motion of the body structure relative to the ground. For raising the body structure, any suitable media, e.g. pressurised fluid, air, hydraulic fluid or any combinations thereof can be supplied to ports 82 and as schematically shown by fluid supply means 80B in FIG. 3; and FIGS. 4, 5 through 5C, 6 and 7 illustrate the inventive principle as applied, for example, to a land vehicle, the main units of which comprise the body structure 10; the intermediate frame 22 (shown in broken lines in FIG. 6) including arms 26, 28, 30, 32 and cross sliding links 42, 44, 46, 48, coil springs 62 or semi-elliptical leaf springs 64, or a combination thereof, as shown in FIG. 5; arm means 70, 72 centrally mounted on the axles, along with their respective arms 70A, 72A, 70B and 72B pivotably mounted thereon and extending to the side brackets 74 of the body structure; the front and rear axle assemblies 18, 20 respectively, including items 76, 78 being the supporting arms mounted at different levels, and items 14, 16 being the ground supports for the body structure.

The illustrated example being within the scope of the appended claims provides improved axle displacement relative to the body structure, since the axles are centrally connected to the body structure only by means of the pivoted arm means, and improved shock absorption provided by the raising means consisting of items 82 and 80 respectively, installed and energized, as described with reference to FIG. 1.

Figure 7:
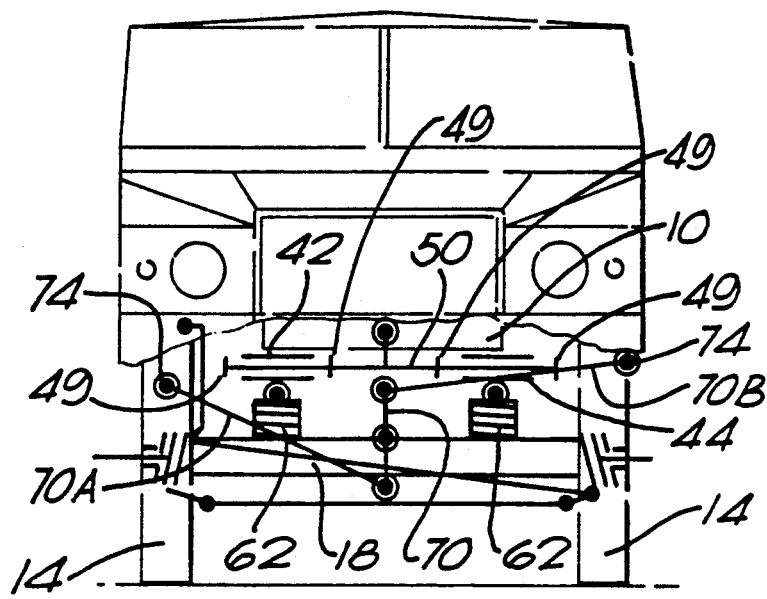
FIGS. 7 to 10 are views of a land vehicle, boat, landing aircraft and prefabricated building respectively, partly sectioned, where necessary, to illustrate some of the various applications of the invention and the free motions in the system.
Figure 8:
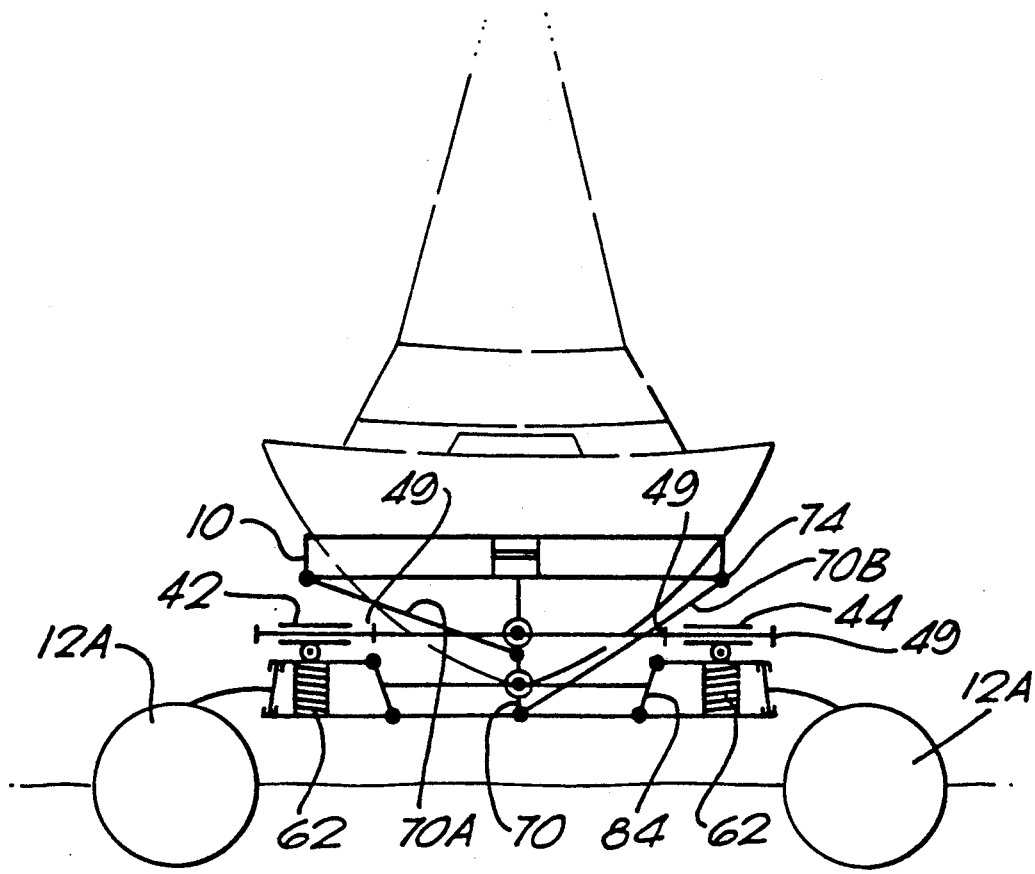

FIG. 8 illustrates another application of the invention in which the solid type axle 18 of FIG. 7 may be replaced by a split type axle 84, and wherein the ground support road wheels 14, 16 are replaced by at least one inflatable member 12A for maintaining a body above water level.

Figure 9:
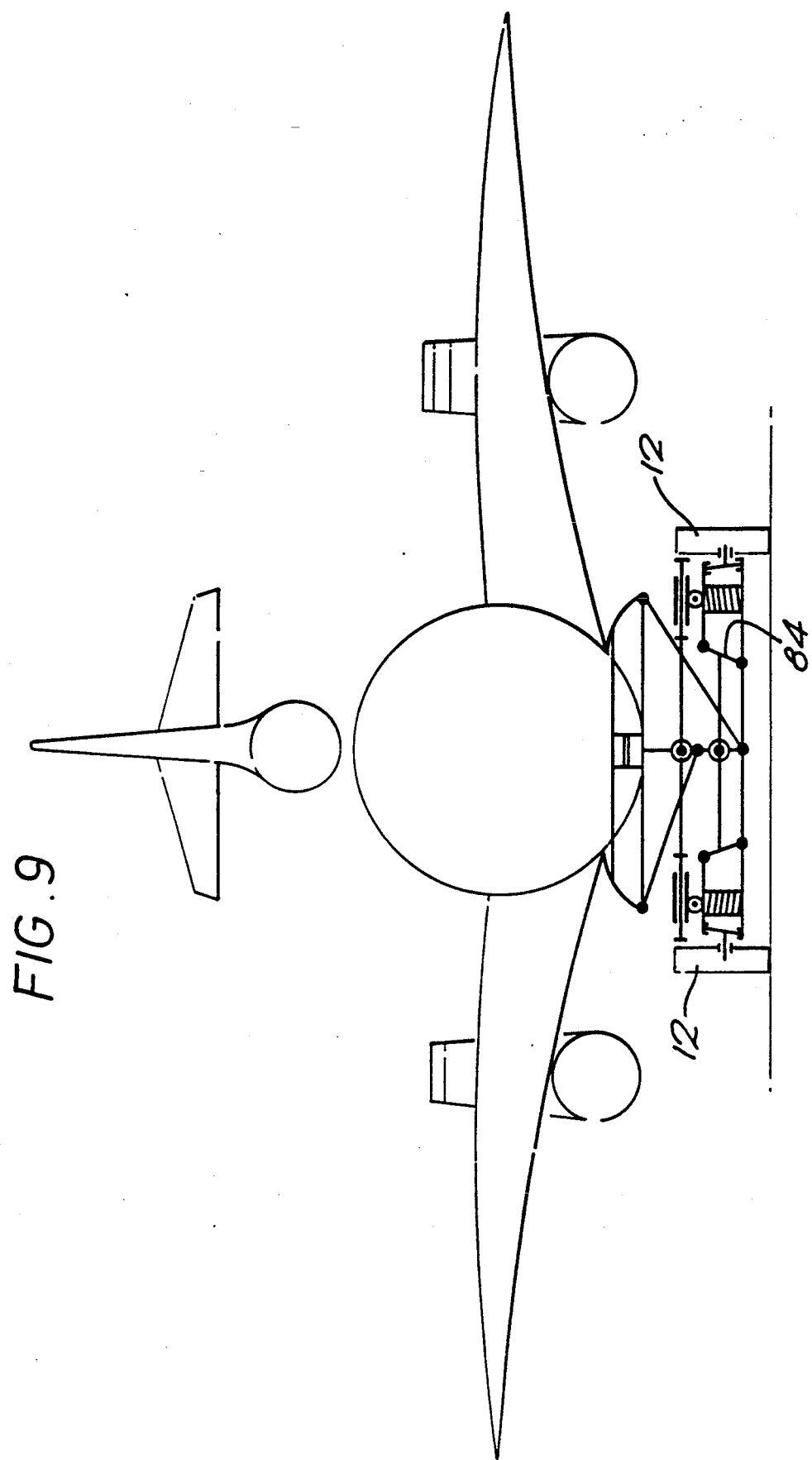

FIG. 9 illustrates another application of the invention as applied to the landing gear means of a typical aircraft employing one or two axles 84 of the kind shown in FIG. 8 and suitable tired ground wheels 12.

Figure 10:
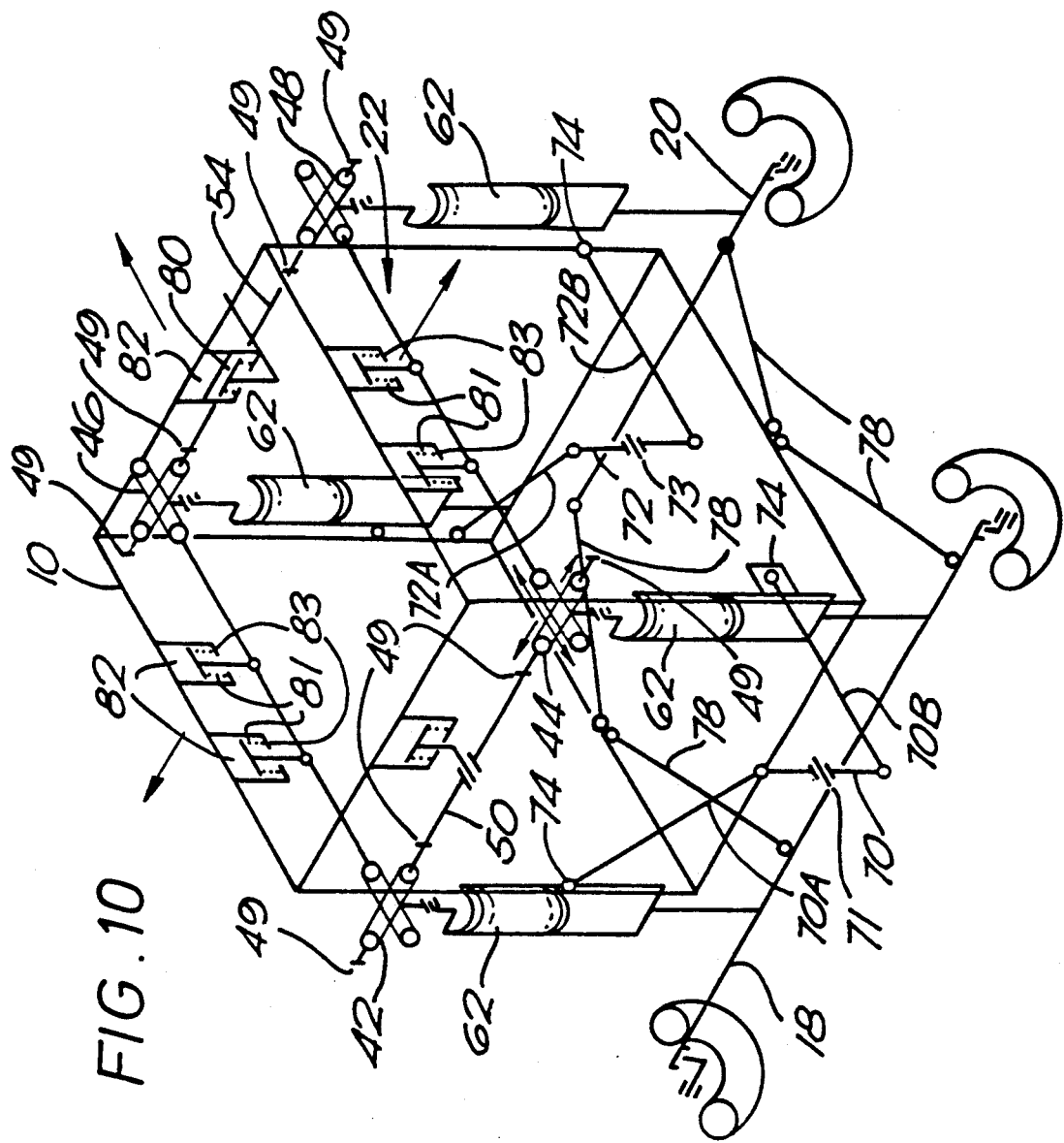

FIG. 10 illustrates another application of the multipurpose suspension system, in the form of a prefabricated building structure having a body structure 10, intermediate frame 22, cross sliding links 42, 44, 46, 48, coil springs 62, centrally mounted arm means 70, 72, with their respective links 70A, 70B, 72A, 72B and brackets 74 fixed to the body structure 10, front and rear axles 18, 20, which may be of the type shown at 84 in FIGS. 8 and 9 and raising means consisting mainly of piston means 80, ports 82, spring means 81 and spring holders 83, the system providing the building structure with multiple degrees of free motion.

In operation, when the vehicle is driven around bends at high speeds the vehicle body will tend to roll in the direction of the centrifugal force but this motion will be limited due to the suspension system geometry and its centralized constrained connections. Thus the vehicle body mounted for rotation about the front and rear axle pins 71 and 73 respectively, through the arm means 70 and 72 and their respective links 70A, 70B and 72A, 72B will move radially through a restricted angle or distance controlled by stops 49 and/or arms 76, 78. Since the arms 50 and 54 follow the radial motion of the body structure, they simultaneously force all four springs 62, 64 downwards into compression. This differs from the arrangement employed in conventional vehicle suspension systems where the springs on one side of the vehicle body are under compression and the springs on the other side of the vehicle body are under tension when the vehicle is driven round a bend. When the vehicle is driven over obstacles which tend to cause the body structure to be lifted both the spring means 62, 64 and the arm means 70, 72 and their extensions act to limit vehicle body motion. When the vehicle is braking, forward motion is limited by the further arms 76, 78, FIG. 3, on both the front and rear axles and at the same time arm 76, FIG. 3 which is mounted above the axle centrepoint limits rotation of the axles creating a moment which is transferred to the body structure.

When the vehicle is driven transversely over mountain or slope the suspension system described herein is able to control any sideways displacement of the vehicle body allowing the vehicle to be driven over such terrain with comfort and improved stability. When the vehicle is driven over very rough terrain where the right and left sides of the vehicle are both being driven over obstacles at the same time and where the front and the rear axles are tilted in opposite directions in relation to one another, the suspension provides improved axle displacement relative one to the other and to the body structure, in view of the intermediate frame and the centrally constrained connection system providing improved independent movement relative to one another.

Further advantages of the suspension system described over known suspension systems include variable centre of gravity, reduction of the height of centre of gravity, increased wheel articulation with less body roll, increased traction on climbing mountain or slope, improved braking efficiency, increased transfer of mass while driving, especially over very rough terrain and improved driver/passenger comfort when the body structure is subjected to road shocks, vertical shocks being automatically converted to radial motion by the system.

Many other improvements and modifications of the suspension system will readily be apparent to those skilled in the art without departing from the scope of the invention defined in the following claims.

I claim:

1. A multi-purpose suspension system for resiliently mounting a rigid body on a rigid base assembly, said system comprising an intermediate frame supported by spring means from said base assembly for limited relative angular movement about an axis vertically aligned with the central longitudinal axis of the base assembly and pivotally supporting said body for limited horizontal and vertical movement relative thereto, and arm means pivotally mounted on at least one end of said base assembly for limited angular movement relative thereto about an axis parallel with the axis of rotation of said intermediate frame, said arm means being connected to opposite sides of said body.

2. A system according to claim 1, wherein said body is rectangular and is provided on all four sides with ports which receive means for raising and lowering said body relative to said intermediate frame.

3. A system according to claim 2, wherein said raising means includes a piston and means for supplying fluid, compressed air or any equivalent pressurized medium to a space between said piston and said body 4. A system according to claim 1, wherein said intermediate frame includes longitudinally extending side members and transversely extending end members, wherein said transversely extending end members are initially slidable laterally of said frame under the influence of centrifugal force, to an extent limited by stops on said transversely extending end members, whereafter downward pressure exerted by said end members upon a first spring means disposed on one side of the system is converted through said arm means into equal downward pressure on the first spring means and a second spring means disposed on a second side of the system.

5. A system according to claim 4, wherein said side frame members each comprise two longitudinally aligned elements, each of said longitudinally aligned elements having an outer end and an inner end, said outer end slidably connected to a first one of the end frame members by a first cross slide and said inner end pivotally connected to a central portion of the side members which support a raising means for said body.

6. A system according to claim 5, wherein said intermediate frame is supported from said base assembly by a coil spring interposed between each of said cross-slides and the corresponding end member of said base assembly.

7. A system according to claim 6, wherein a first end of said intermediate frame is supported from said base assembly by the coil springs and a second end of said intermediate frame is supported from said base assembly by a semi-elliptical leaf spring.

8. A system according to claim 1, wherein said intermediate frame is supported from said base assembly by semi-elliptical leaf springs each pivotally secured at its ends to a side member of said frame and secured between its ends to an end member of said base assembly.

9. A system according to claim 8, wherein a first end of each of said semi-elliptical leaf springs is secured to said intermediate frame by a shackle.

10. A system according to claim 1, wherein said intermediate frame is supported from said base assembly by semi-elliptical leaf springs, each pivotally secured at its outer end to a side member of said frame and its inner end to said rigid body and secured between its ends to an end member of said base assembly.

11. A system according to claim 1, wherein said intermediate frame is supported from said base assembly by a combination of a coil spring and a quarter elliptical leaf spring, wherein said coil spring is interposed between a side member of said frame and an end member of said base assembly and said quarter elliptical leaf spring is pivotally secured by a first end to said rigid body and by a second end to said end member of said base assembly.

12. A system according to claim 1, wherein said intermediate frame is supported from said base assembly by a combination of a coil spring and a quarter elliptical leaf spring, wherein said coil spring is interposed between a side member of said frame and an end member of said base assembly and said quarter elliptical leaf spring is pivotally secured by its first end to said intermediate frame.

13. A system according to claim 1, wherein said spring means is selected from the group consisting of:
(a) coil springs;
(b) semi-elliptical leaf springs;
(c) quarter elliptical leaf springs;
(d) piston means operated by pressurized fluid;
(e) torsion bars;
(f) at least one coil spring and at least one semi-elliptical leaf spring;
(g) at least one coil spring and at least one quarter-elliptical leaf spring; and
(h) piston means and at least one coil spring.

14. A system according to claim 1, wherein said arm means are provided having first and second opposing ends, each of said first and second opposing ends being pivotally connected to first and second cross links, each of said cross links being pivotally connected to a corresponding one of first and second brackets, said first bracket coupled to a first side of said body and said second bracket coupled to a second opposite side of said body.

15. A system according to claim 1, wherein said base assembly includes ground wheels rotatably mounted at the ends of at least one transverse axle.

16. A system according to claim 15, wherein said base assembly includes at least four ground wheels mounted on front and rear axles.

17. A system according to claim 16, wherein a first end of said base assembly supports a pair of longitudinally extending arms, a first end of a first one of said longitudinally extending arms pivotally mounted to a first level of said base assembly and a second end of a second one of said longitudinally extending arms pivotally mounted to a second different level of said base assembly and each of said longitudinally extending arms having an inner end and pivotally connected to said body, said pair of longitudinally extending arms coupled between said base assembly and said body for restricting forward movement of said body during braking.

18. A system according to claim 15, wherein a first end of said base assembly supports a pair of longitudinally extending arms, a first end of a first one of said longitudinally extending arms pivotally mounted to a first level of said base assembly and a second end of a second one of said longitudinally extending arms pivotally mounted to a second different level of said base assembly and each of said longitudinally extending arms having an inner end pivotally connected to said body, said pair of longitudinally extending arms coupled between said base assembly and said body for restricting forward movement of said body during braking.

19. A system according to claim 1, wherein said base assembly includes at least two floats mounted at the ends of at least one transverse axle to maintain said body above a surface of water.

20. A system according to claim 1, wherein said rigid body is selected from the group consisting of a land vehicle body, a boat body, an aircraft body and a prefabricated building body.

* * * * *

UNITED STATES PATENT AND TRADEMARK OFFICE
CERTIFICATE OF CORRECTION

PATENT NO. : 5,316,326
DATED : May 31, 1994
INVENTOR(S) : Nester E. Kyriacou

It is certified that error appears in the above-indentified patent and that said Letters Patent is hereby corrected as shown below:

Column 2, line 3, "FIG. 5C" should read --FIG. 5B--.

Signed and Sealed this

Third Day of January, 1995

Attest:

BRUCE LEHMAN

*Attesting Officer*    *Commissioner of Patents and Trademarks*